United States Patent
Mumick et al.

(10) Patent No.: US 8,238,881 B2
(45) Date of Patent: Aug. 7, 2012

(54) SYSTEM AND METHOD FOR PROVIDING MULTI-MODAL BOOKMARKS

(75) Inventors: Inderpal Singh Mumick, Berkeley Heights, NJ (US); Sandeep Sibal, Scotch Plains, NJ (US)

(73) Assignee: Waloomba Tech Ltd., L.L.C., Wilmington, DE (US)

( * ) Notice: Subject to any disclaimer, the term of this patent is extended or adjusted under 35 U.S.C. 154(b) by 0 days.

(21) Appl. No.: 10/211,117

(22) Filed: Aug. 2, 2002

(65) Prior Publication Data

US 2003/0032456 A1    Feb. 13, 2003

Related U.S. Application Data

(60) Provisional application No. 60/310,610, filed on Aug. 7, 2001.

(51) Int. Cl.
*H04L 12/58*    (2006.01)
*H04M 1/663*    (2006.01)

(52) U.S. Cl. ............. 455/412.1; 455/566; 709/217; 709/218; 709/219

(58) Field of Classification Search ............ 455/556, 455/412.1, 412, 163, 566; 709/217–219
See application file for complete search history.

(56) References Cited

U.S. PATENT DOCUMENTS

| | | | |
|---|---|---|---|
| 6,208,839 B1 | 3/2001 | Davani | |
| 6,842,767 B1 * | 1/2005 | Partovi et al. | 709/203 |
| 7,116,765 B2 * | 10/2006 | Summers et al. | 379/88.17 |
| 2001/0006890 A1 | 7/2001 | Ryu | |
| 2001/0018353 A1 | 8/2001 | Ishigaki | |
| 2006/0287845 A1 | 12/2006 | Cross et al. | |

FOREIGN PATENT DOCUMENTS

| | | |
|---|---|---|
| EP | 0848373 B1 | 6/1998 |
| EP | 1-100-013 A2 | 5/2001 |
| EP | 1423968 | 6/2004 |
| WO | WO99/46920 | 9/1999 |
| WO | WO 2004/014053 | 2/2004 |

OTHER PUBLICATIONS

International Patent Application No. PCT/US02/24885: International Search Report dated Nov. 26, 2002, 1 page.

* cited by examiner

*Primary Examiner* — Yuwen Pan
(74) *Attorney, Agent, or Firm* — Woodcock Washburn LLP

(57) ABSTRACT

A system for enabling multi-modal bookmarks comprises a bookmark repository coupled to two browsers. A user bookmarks content using a first browser, and a bookmark is stored in the bookmark repository. The user subsequently uses a second browser and requests that the bookmark be de-referenced to point the second browser to the bookmarked content. The second browser accesses the bookmark in the content repository and is directed to the bookmarked content. The first and second browsers may be visual and voice browsers that render Wireless Markup Language (WML) and Voice Extensible Markup Language (VXML) content, respectively, wherein a mapping is provided that links a given piece of visual content to an equivalent piece of voice content.

13 Claims, 2 Drawing Sheets

SYSTEM AND METHOD FOR PROVIDING MULTI-MODAL BOOKMARKS

CROSS-REFERENCE TO RELATED APPLICATIONS

This application claims the benefit of U.S. Provisional Application No. 60/310,610, entitled "System and Method for Providing Multi-Modal Bookmarks," filed Aug. 7, 2001.

FIELD OF THE INVENTION

The present invention relates generally to the field of telephony. More particularly, the invention provides a technique for providing multi-modal bookmarks. In accordance with exemplary aspects of the invention, a user who browses the web using a visual browser may bookmark a page, and that bookmark is later available to the user for browsing the web in voice mode.

BACKGROUND OF THE INVENTION

As computer technology becomes more widely available, the transmission of voice information has become increasingly intertwined with the transmission of data. Thus, many telephones enable a user to interact with content either in an audio mode (i.e., using a speaker and microphone), or a visual mode (i.e., using a visual display and some type of input device such as a keypad).

One application of modem telephones is the use of the "wireless web." By using a telephone (e.g., a wireless telephone) with a WAP browser that renders Wireless Markup Language (WML) content, a user can access the Internet. Similarly, the user can also access the internet by telephone using a "voice browser" that allows a user to interact with Voice extensible Markup Language (VXML) content. Content is not always amenable to a single mode of communication. That is, in some cases it is most convenient to allow a user to interact with content either in voice mode or visual mode, rather than to restrict the user to a particular mode. An architecture that permits a user to interact with a single application (or item of content) in both voice and visual modes can be referred to as "multi-modal."

One problem that arises when a user wishes to access the web in both visual and voice modes is that a user may bookmark a page using a first browser (e.g., a visual browser), and, when the user accesses the web using a different browser (e.g., a voice browser), that page is no longer bookmarked, because the bookmark is accessible only by a particular browser.

In view of the foregoing, there is a need for a bookmark system that overcomes the drawbacks of the prior art.

SUMMARY OF THE INVENTION

The present invention provides a system for storing bookmarks, such that the bookmarks can be accessed using a plurality of browsers. For example, a user may browse the wireless web with a visual browser (e.g., a WAP browser), and may bookmark a particular page. The bookmark is then stored in a bookmark repository, which is accessible to both the visual browser and a voice browser. When the same user browses the wireless web using a voice browser, the user may access the bookmark that was created with the visual browser. The content used with the visual browser need not be identical to the content used with the voice browser; a relationship may be defined that links bookmarked visual content with equivalent voice content. The use of bookmarks in the context of the wireless web, visual browsers, and voice browsers is merely exemplary; in accordance with the invention, bookmarks may be used in connection with content other than wireless web content, and in connection with applications other than visual and voice browsers.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

The present invention provides a system and method whereby a user who browses content using a first browser (e.g., a visual browser) may bookmark a page such that the bookmark is available to the user for browsing the content with a second browser (e.g., a voice browser). For example, a user may bookmark a particular retail web site using a WAP browser, and then use the bookmark to access that page in a separate session with a voice browser.

Figure 1:
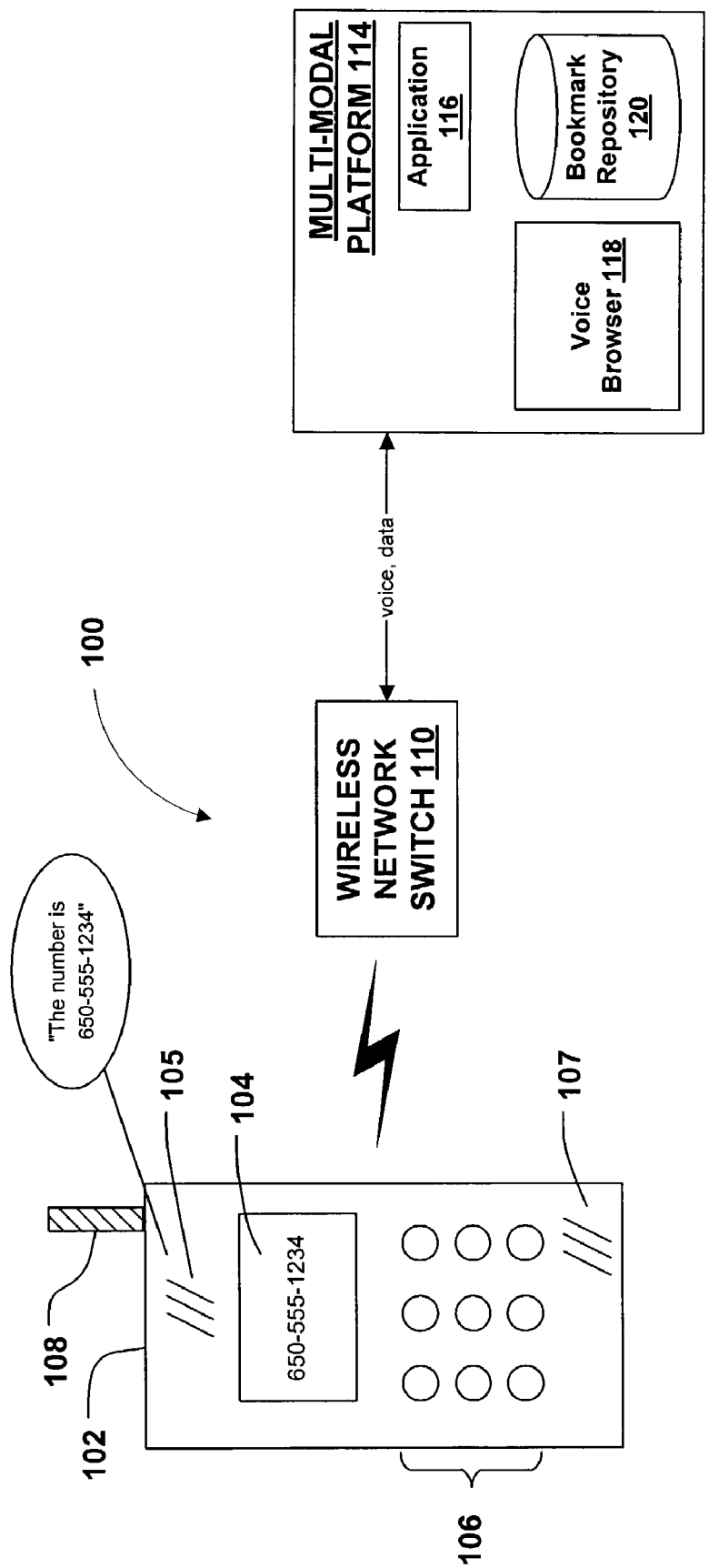
FIG. 1 is a block diagram of a telephone network architecture in which aspects of the invention may be implemented.

FIG. 1 shows a telephone network architecture 100. Architecture 100 includes a wireless telephone 102, a wireless network switch 110, and a multi-modal platform 114. While architecture 100 is shown, for exemplary purposes only, in the context of wireless telephony, it will be appreciated that the invention applies to any type of telephony or communications architecture including (but not limited to) wired telephony.

In a preferred embodiment, wireless telephone 102 comprises a visual display 104, an audio speaker 105, a keypad 106, a microphone 107, and an antenna 108. Visual display 104 may, for example, be a Liquid Crystal Display (LCD) which displays text and graphics. Audio speaker 105 renders audio signals (e.g., signals received from other components in architecture 100) in order to produce audible sound. Keypad 106 may be an alpha-numeric keypad that allows a user to input alphanumeric characters. Depending upon context, wireless telephone may respond to input from keypad 106 by displaying appropriate characters on display 104, transmitting ASCII representations of such characters, or (in the case of numeric input) generating appropriate DTMF signals. Microphone 107 captures audio signals, which may, in one example, be digitally sampled by wireless telephone 102 for wireless transmission to other components of network architecture 100. Antenna 108 is used by wireless telephone 102 to transmit information to, and receive information from, components within architecture 100. For example, wireless telephone 102 may use antenna 108 to receive digital audio signals for rendering on speaker 105, to transmit digital audio signals captured by microphone 107, to receive data to be displayed on visual display 104, or to transmit data captured with keypad 106. Wireless telephone 102 may also contain computing components (not shown). For example, wireless telephone 102 may have a memory and a processor, which may be used to store and execute software (e.g., software that digitally samples audio signals captured with microphone 107, software that generates analog audio signals from digitally-sampled audio received through antenna 108, software that enables the browsing of content using visual display 104 and keypad 106, etc.). In one example, wireless telephone 102 may include a WAP browser that includes the capability to bookmark pages of the wireless web. The structure of a wireless telephone 102 that employs the components shown in FIG. 1 in connection with a memory and processor will be apparent to those of skill in the art, and thus is not discussed at length herein.

One feature of wireless telephone 102 is that it can be viewed as having two different "modes" of communication. On the one hand, wireless telephone 102 communicates in a "voice" mode; on the other hand, wireless telephone 102 communicates in a "visual" mode. In voice mode, wireless telephone uses microphone to capture audio (which may be digitally sampled and then transmitted through antenna 108), and uses speaker to render audio (which may be received through antenna 108 in a digital form). "Voice" mode is exemplified by the conventional usage of a telephone in which a first party uses the telephone to engage in two-way speech with another party. In "visual" mode, wireless telephone uses keypad 106 to capture data (e.g., alpha-numeric data which may be represented in ASCII form), and uses visual display 104 to render data. The captured data may be transmitted through antenna 108, and antenna 108 may also be used to receive the data that is to be displayed on visual display 104.

Wireless telephone 102 communicates with a wireless network switch 110. Wireless network switch is coupled to a tower (not shown) that engages in two-way communication with wireless telephone 102 through antenna 108. Wireless network switch 110 connects wireless telephone 102 to various components, such as multi-modal platform 114, or Public Switched Telephone Network (PSTN) (not shown). Multi-modal platform 114 is described in further detail below; a PSTN is known in the art and thus is not described herein.

In accordance with aspects of the invention, multi-modal platform 114 may facilitate communication with wireless telephone 102 in two "modes" (i.e., in voice mode and visual mode). For example, multi-modal platform 114 may be adapted to send audio information to and receive audio information from wireless telephone 102 through switch 110 using a voice channel. Multi-modal platform 114 may likewise be adapted to send visual data to and receive visual data from wireless telephone 102 through switch 110 using a data channel. Moreover, multi-modal platform 114 may be adapted to change between these two "modes" of communicating according to instructions or existing communications conditions. Multi-modal platform 114 may be embodied as a computing device programmed with instructions to perform these functions.

Multi-modal platform 114 may be or comprise a computing device that includes various types of processing capability and storage. In one example, multimodal platform includes an application engine 116. Application engine 116 is software that provides content to a user—either content located on multi-modal platform, or content that is generated elsewhere (e.g., at a web site provider's computing device). Application engine 116 provides the content either in a voice form or a visual form, depending on which mode is appropriate for telephone 102 to interact with the content. (The "appropriateness" of a particular mode may be determined by an express user instruction, an instruction from the underlying application, or some analysis of the operating conditions that weigh in favor of one mode or another.)

Figure 2:
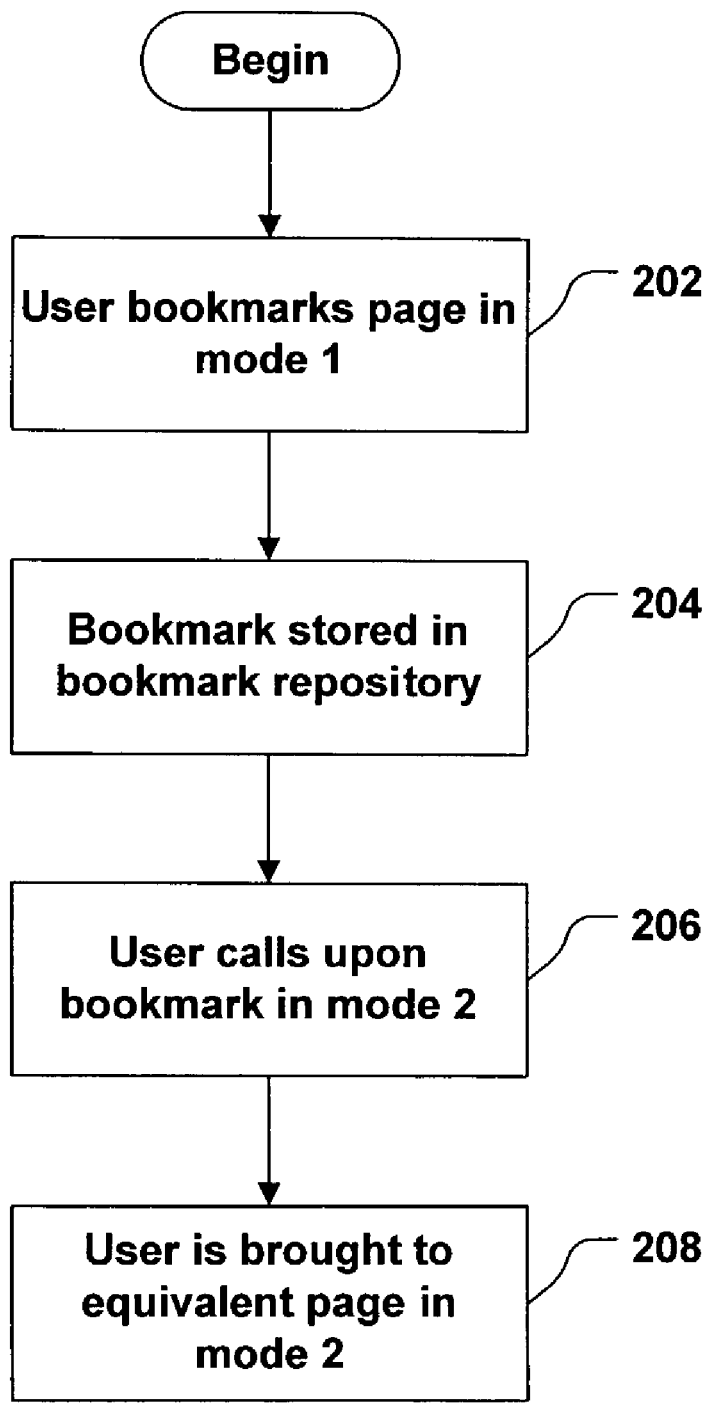
FIG. 2 is a flow diagram of an exemplary bookmark process in accordance with aspects of the invention.

Multi-modal platform 114 may include, or be associated with, bookmark repository 120. As noted above, telephone 102 may include a WAP browser that allows a user to browse the wireless web and to bookmark content therein. An exemplary process of bookmarking a page is described with reference to both FIG. 1 and FIG. 2.

In one embodiment, when the user bookmarks a page (FIG. 2, block 202), the bookmark is stored in bookmark repository 120 (block 204). That is, executing a bookmark function on telephone 102's WAP browser causes telephone 102 to generate data indicative of the bookmark, and to communicate this data to bookmark repository 120 (e.g., by using antenna 108 to transmit this data to multi-modal platform 114 via wireless network switch 110).

Bookmark repository 120 is accessible to voice browser 118. Thus, if the user, subsequent to bookmarking a page as described above, engages in a browsing session using voice browser 118, the user may call upon the bookmark and return to the bookmarked page (block 206). Thus, since bookmark repository 118 is accessible to both the visual browser and the voice browser, the user can access the same set of bookmarks regardless of whether he is browsing in voice mode or visual mode. If the user calls upon the bookmark in a mode that is different from the mode in which he originally generated the bookmark, the user will be brought to an equivalent page in the new mode (block 208), as more particularly described below.

It will be appreciated that not all visual content has an exact analogue in voice, and vice versa. Thus, a mapping may be created that links visual content with equivalent voice content, such that every bookmark (or at least a subset of all potential bookmarks) has a defined meaning for both visual and voice browsing. The nature of this mapping depends on the relationship between visual and voice content. Every bookmark also is itself multimodal and can be accessed in both voice and visual modes.

In one example, every visual page has an equivalent voice page (e.g., a content provider provides a given page of content in both Wireless Markup Language (WML) and in Voice extensible Markup Language (VXML)). In another example, every Universal Record Locator (URL) points to plural pages written in various markup languages, and every GET request for a URL includes an identification of the type of browser that generated the request. In this case, no mapping is necessary, since the server at which the URL is located provides a different page based on what type of browser is identified in the GET request. In yet another example, a complex relationship between visual and voice content is defined, such that every bookmark entered in one mode will have meaning in the other mode, even if there is no obvious canonical relationship between voice and visual content pages. One context in which this type of mapping may be necessary is if a bookmark generated in WML or VXML is to have meaning for Hypertext Markup Language (HTML) content, since HTML content is often structured differently from its WML or VXML counterparts.

According to one feature of the invention, bookmark repository 120 may maintain a hierarchical structure of bookmarks, as specified by the user. Thus, if a user organizes bookmarks in folders (e.g., "sports," "music," etc.), the voice system may provide menus based on this hierarchical structure. Alternatively, a user may be able to speak the name of a bookmark, which bypasses the menus that support the hierarchical structure (or queries the user as to which sub-tree of the hierarchical structure the user intended, if two bookmarks have a common, non-unique name).

According to another feature of the invention, a bookmark may specify a preferred "mode" for interacting with the bookmark. In other words, the bookmark may be stored in a data structure that includes, as one of its fields, a specification of mode (e.g., voice or visual), wherein, upon re-directing to the bookmarked content, multi-modal platform 114 switches to the mode specified in the bookmark. One variation on this design is that platform 114 may take into account the specified mode, but may override it based on a variety of factors (e.g., the unavailability of the specified mode, overriding instructions generated by the applications that provides the content, an overriding instruction from a user, etc.) Another variation on this design is to allow the user to specify the preferred mode as being the mode that the user is currently using at the time the bookmark is accessed.

According to another feature of the invention, bookmarks may be sent by a browser to bookmark repository 120 either continuously (i.e., as they are generated by the user), or in a "batch" mode (i.e., once per hour, once per day, once per week, etc.). The repository 120 allows for persistence. In a variation on the invention, repository 120 may be situated at the wireless telephone 102.

According to another feature of the invention, bookmarks may be "annotated." That is, the user may provide his or her own description of the bookmark. As one example, the user may type the description when bookmarking content in visual mode, and this description may be "read" (e.g., by a voice synthesis system) when the user accesses the bookmark in voice mode.

While the foregoing examples have been provided in the context of wireless telephony, it should be noted that the above-described system can also be deployed in any communications context, such as a wired telephone system. For example, wireless telephone switch 110 can be a wired-network telephone switch, such as a "5E," and wireless telephone 102 may be embodied as an wired telephone that is enabled to receive both voice and data.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of synchronizing bookmarks comprising:
   receiving a request to save a first bookmark identifying a first web document in a first mode, the first bookmark received from a first browser executing in the first mode, the first mode being one of a visual mode and a voice mode;
   receiving, from the first browser, the first bookmark comprising data indicative of the first web document;
   storing the first bookmark in a bookmark repository on a multimodal platform, the bookmark repository operable for storing one or more bookmarks in a multimodal format and accessible to a plurality of browsers regardless of whether the browsers are executing in the visual or voice mode;
   receiving, from a second browser executing in a second mode, the second mode being one of the visual or voice mode, a request to access the first bookmark;
   linking the first bookmark with a second web document in the second mode containing substantially equivalent content of the first web document, the second web document compatible with the second browser based on a relationship between the first web document and the second web document; and
   sending a second bookmark identifying the second web document to the second browser, wherein the second browser executing in the second mode is operable to navigate to the second web document using the second bookmark.

2. The method of claim 1, wherein web documents of the first browser are linked to corresponding second web documents of the second browser, the corresponding second web documents containing substantially equivalent content of the first web documents.

3. The method of claim 1, wherein there is no canonical relationship between the first web document of the first mode and the second web document of the second mode.

4. The method of claim 1, wherein a universal resource locator points to a plurality of pages written in a plurality of markup languages, and the request to access the first web document is associated with an identification of a type of browser that generated the request.

5. The method of claim 1, wherein the bookmark repository comprises a hierarchical structure of bookmarks comprising folders in the first mode, and wherein the second browser is operable to render menus based on the hierarchical structure in the second mode.

6. The method of claim 5, wherein the second browser menus are configured to be bypassed.

7. The method of claim 1, wherein the first bookmark specifies a preferred mode for interacting with the second web document, further comprising, upon re-directing and the second browser is directed to the second web document operating in the mode specified in the first bookmark.

8. The method of claim 7, further comprising overriding the preferred mode of interacting with the second web document based on one of unavailability of the preferred mode, overriding instructions generated by an application that provides the second web document, and an overriding instruction from a user.

9. The method of claim 1, wherein the preferred mode is the mode that is operative at the time the first bookmark is accessed.

10. The method of claim 1, further comprising receiving a textual annotation describing the bookmark.

11. The method of claim 1, wherein the bookmark repository further stores annotative data descriptive of the first web document.

12. A system for storing bookmarks, the system comprising a processor and memory, the system configured to:
   receive a request to save a first bookmark identifying a first web document in a first mode, the first bookmark received from a first browser executing in the first mode, the first mode being one of a visual mode and a voice mode;
   receive, from the first browser, the first bookmark comprising data indicative of the first web document;
   store the first bookmark in a bookmark repository on a multimodal platform, the bookmark repository operable for storing one or more bookmarks in a multimodal format and accessible to a plurality of browsers regardless of whether the browsers are executing in the visual or voice mode;

receive, from a second browser executing in a second mode, the second mode being one of the visual or voice mode, a request to access the first bookmark;

link the first bookmark with a second web document in the second mode containing substantially equivalent content of the first web document, the second web document compatible with the second browser based on a relationship between the first web document and the second web document; and send a second bookmark identifying the second web document to the second browser, wherein the second browser executing in the second mode is operable to navigate to the second web document using the second bookmark.

13. A non-transitory computer readable medium having computer executable instructions stored thereon, the instructions comprising:

instructions for receiving a request to save a first bookmark identifying a first web document in a first mode, the first bookmark received from a first browser executing in the first mode, the first mode being one of a visual mode and a voice mode;

instructions for receiving, from the first browser, the first bookmark comprising data indicative of the first web document;

instructions for storing the first bookmark in a bookmark repository on a multimodal platform, the bookmark repository operable for storing one or more bookmarks in a multimodal format and accessible to a plurality of browsers regardless of whether the browsers are executing in the visual or voice mode;

instructions for receiving, from a second browser executing in a second mode, the second mode being one of the visual or voice mode, a request to access the first bookmark;

instructions for linking the first bookmark with a second web document in the second mode containing substantially equivalent content of the first web document, the second web document compatible with the second browser based on a relationship between the first web document and the second web document; and instructions for sending a second bookmark identifying the second web document to the second browser, wherein the second browser executing in the second mode is operable to navigate to the second web document using the second bookmark.

* * * * *

UNITED STATES PATENT AND TRADEMARK OFFICE
CERTIFICATE OF CORRECTION

| | | |
|---|---|---|
| PATENT NO. | : 8,238,881 B2 | Page 1 of 1 |
| APPLICATION NO. | : 10/211117 | |
| DATED | : August 7, 2012 | |
| INVENTOR(S) | : Mumick et al. | |

It is certified that error appears in the above-identified patent and that said Letters Patent is hereby corrected as shown below:

In Column 1, Line 30, delete "modem" and insert -- modern --, therefor.

In Column 1, Line 36, delete "extensible" and insert -- eXtensible --, therefor.

In Column 2, Line 49, delete "alphanumeric" and insert -- alpha-numeric --, therefor.

In Column 4, Line 41, delete "extensible" and insert -- eXtensible --, therefor.

In Column 6, Line 40, in Claim 7, delete "document, further comprising, upon re-directing" and insert -- document --, therefor.

Signed and Sealed this
Twenty-ninth Day of January, 2013

David J. Kappos
*Director of the United States Patent and Trademark Office*